US012437083B2

(12) United States Patent
Ricchuiti et al.

(10) Patent No.: US 12,437,083 B2
(45) Date of Patent: Oct. 7, 2025

(54) UTILIZATION OF SERVICE WORKERS TO ENCRYPT APPLICATION DATA

(71) Applicant: Capital One Services, LLC, McLean, VA (US)

(72) Inventors: Andrew Ricchuiti, McLean, VA (US); Mark Morrison, McLean, VA (US); Lathan Carter, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 986 days.

(21) Appl. No.: 17/497,634

(22) Filed: Oct. 8, 2021

(65) Prior Publication Data

US 2023/0115553 A1   Apr. 13, 2023

(51) Int. Cl.
| G06F 21/60 | (2013.01) |
| G06F 8/61  | (2018.01) |
| G06F 9/54  | (2006.01) |
| G06F 21/62 | (2013.01) |

(52) U.S. Cl.
CPC .............. *G06F 21/602* (2013.01); *G06F 8/61* (2013.01); *G06F 9/541* (2013.01); *G06F 21/6245* (2013.01)

(58) Field of Classification Search
CPC .......... G06F 21/602; G06F 8/61; G06F 9/541; G06F 21/6245; G06F 21/6263
See application file for complete search history.

(56) References Cited

U.S. PATENT DOCUMENTS

| 8,935,755 | B1* | 1/2015 | Kay ................... G06F 9/44526 726/4 |
| 8,950,005 | B1* | 2/2015 | Torney ................. H04L 63/101 713/193 |
| 9,241,004 | B1* | 1/2016 | April ..................... G06F 40/117 |
| 9,860,229 | B2* | 1/2018 | Miles ...................... H04L 63/08 |
| 11,366,927 | B1* | 6/2022 | Chandrasekaran .... G16H 10/60 |
| 11,423,173 | B2* | 8/2022 | Edison ................ H04L 63/0272 |
| 2010/0154038 | A1* | 6/2010 | Natarajan ............... G06F 21/62 726/5 |

(Continued)

OTHER PUBLICATIONS

Su, Jessica, et al. "De-anonymizing web browsing data with social networks." Proceedings of the 26th international conference on world wide web. 2017. (Year: 2017).*

*Primary Examiner* — Jung W Kim
*Assistant Examiner* — Sameera Wickramasuriya
(74) *Attorney, Agent, or Firm* — Foley & Lardner LLP

(57) ABSTRACT

Methods and systems for a service worker framework are provided herein. When a web application is accessed through a web browsing application, the web browsing application may invoke a service worker specifically created for the web application. The service worker may serve as an intermediary between the web application and the web browsing application and may intercept application data transmitted between the web browsing application and the web application. For example, the service worker may extract and encrypt any identification data included in the application data when it is received by a web browsing application. The service worker may store the encrypted identification data, for example, within the cache of the web browsing application and send modified application data to the web application (e.g., excluding the identification data).

20 Claims, 6 Drawing Sheets

(56) References Cited

U.S. PATENT DOCUMENTS

| | | | |
|---|---|---|---|
| 2013/0179985 A1* | 7/2013 | Strassmann | H04L 63/0428 726/26 |
| 2014/0025949 A1* | 1/2014 | Kay | G06F 21/31 713/168 |
| 2014/0282884 A1* | 9/2014 | Bao | G06F 21/316 726/4 |
| 2015/0128285 A1* | 5/2015 | LaFever | H04L 63/0414 726/26 |
| 2016/0085915 A1* | 3/2016 | Seow | G16Z 99/00 705/3 |
| 2016/0292457 A1* | 10/2016 | Bodorik | H04L 63/08 |
| 2017/0223003 A1* | 8/2017 | Miles | H04L 63/02 |
| 2019/0163453 A1* | 5/2019 | Seksenov | H04L 67/34 |
| 2020/0258605 A1* | 8/2020 | Blechman | G16H 40/67 |
| 2022/0253541 A1* | 8/2022 | Sloane | G06F 16/258 |

* cited by examiner

UTILIZATION OF SERVICE WORKERS TO ENCRYPT APPLICATION DATA

BACKGROUND

Many enterprises supplement their websites with web applications that are designed to be executed within a web browser. A plethora of those applications enable a user to log in and have a customized experience based on the user's preferences and session interactions. When the user logs in user data may travel from the website through the web browser before it is received by the application. That user data is usually accompanied by identification data that identifies the user or the session that the user established. This data is often stored in the front-end of web storage (accessible by any process that uses the web browser), which exposes the identification data to any party that may access the web browser. Current solutions to this issue include storing the data in local storage or in a back-end cache. However, these solutions lack adequate security measures to ensure protection of the data, as the identification data may still be accessed and stolen. This leaves users' identification data exposed to hackers or other malicious actors.

SUMMARY

To address these and other issues, a service worker framework may be used. When a web application (e.g., a java application) is accessed through a web browsing application, the web browsing application (e.g., a web browser such as Chrome, Firefox™, etc.) may invoke a service worker specifically created for the web application. The service worker may serve as an intermediary between the web application and the web browsing application and may intercept application data transmitted between the web browsing application and the web application. For example, the service worker may strip out and encrypt any identification data included in the application data when it is received by a web browsing application. The service worker may store the encrypted identification data, for example within the cache of the web browsing application and send modified application data to the web application (e.g., excluding the identification data). Therefore, the application data is available to the web application and no longer includes sensitive identification information that may be compromised. Furthermore, the identification data is encrypted, providing added measures of security. The service worker may additionally receive outgoing application data received from the web application, determine which data was stripped out and then decrypt and add the data into the outgoing package, so that the server receiving the data is able to match the data to a correct process.

In particular, the process described above may be performed when a service worker has been created by the web application provider and registered with the web browsing application. The computing device may receive, with a first application (e.g., a web browsing application), first application data. The first application data may be received (e.g., from a remote server), for use by a second application (e.g., web application) that is executed within the first application. The second application may be executed within the first application. For example, the first application may be a web browser executing a java applet that is being executed within the web browser. In some embodiments, the first application data (e.g., session data) may be part of a session associated with a particular user. The session data may include information (e.g., user identifier, sessions identifier, etc.) that, if accessed by a nefarious party, may enable that party access to restricted/private user data.

The first application may, upon receiving the first application data, invoke, a third application (e.g., a service worker). The third application may be enabled to communicate with the first application and the second application. For example, the third application may be a service worker that has been provided by the web application provider and may have been installed with the web browser. Thus, the service worker is enabled to interface with both the first application (the web browsing application) and the second application (the web application). The first application may invoke the third application using an application programming interface (API) using a name that was registered with the first application when the third application was installed.

In some embodiments, the first application (the web browsing application) may invoke the third application (the service worker) using the following mechanism. The first application may retrieve an identifier associated with the second application (the web application). The identifier may be a string, a number, a hexadecimal number and/or another suitable identifier. The first application (the web browsing application) may compare the identifier associated with the second application with a plurality of identifiers. Each identifier in the plurality of identifiers may correspond to an application that is able to interface between the first application and a different application being executed within the first application. For example, each service worker may be associated with an identifier of the web application corresponding to the service worker. Thus, the web browsing application is able to identify the correct service worker to instantiate. The first application (the web browsing application) may then retrieve the third application (the service worker) based on determining the identifier associated with the second application that matches the third application.

In some embodiments, the first application (the web browsing application) may determine whether the second application (web application) has a corresponding third application (the service worker) installed/registered within the first application. The first application may determine (e.g., using an identifier associated with the second application) that the third application is not installed. For example, a web browser may determine that a particular java application being executed within the web browser does not have an associated service worker. However, the web browser may retrieve, using uniform resource locator (URL) associated with the third application, an installation package corresponding to the third application. For example, the java application may include metadata with the URL. The first application may then install the third application using the installation package.

The third application, when instantiated, may extract, from the first application data, identification data associated with a user. As a result of the extraction, the first application data may be transformed into modified first application data that does not include the identification data. In some embodiments, the first application data may include associated metadata that may indicate the identification data to the third application (the service worker). For example, the service worker may access the metadata and determine which fields within the first application data should be extracted. Thus, the identification data may not be used by the second application itself, but instead may be used by a remote computing device (e.g., a remote server) to identify the user, the session, or the like.

The third application (the service worker) may encrypt the identification data into encrypted identification data. The service worker may use various available encryption algorithms to encrypt the identification data. The third application (the service worker) may then store the encrypted identification data within storage corresponding to the first application. The storage corresponding to the first application may be shared amongst the second application (the web application) and other applications executing within the first application. The third application may then provide the modified first application data to the second application (e.g., through the first application).

When the second application (the web application) processes the first application data, the second application may transmit a response that includes second application data (e.g., to a remote server). Thus, the first application may receive from the second application, second application data. The third application (the service worker) may receive the second application data and retrieve, from the storage the identification data, decrypt it and cause that second application data together with the identification data to be transmitting to a remote computing device (e.g., to a remote server).

Various other aspects, features, and advantages of the disclosure will be apparent through the detailed description of the disclosure and the drawings attached hereto. It is also to be understood that both the foregoing general description and the following detailed description are examples and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION

In the following description, for the purposes of explanation, numerous specific details are set forth in order to provide a thorough understanding of the disclosure. It will be appreciated, however, by those having skill in the art, that the disclosure may be practiced without these specific details or with an equivalent arrangement. In other cases, well-known structures and devices are shown in block diagram form to avoid unnecessarily obscuring the disclosure.

Figure 1:
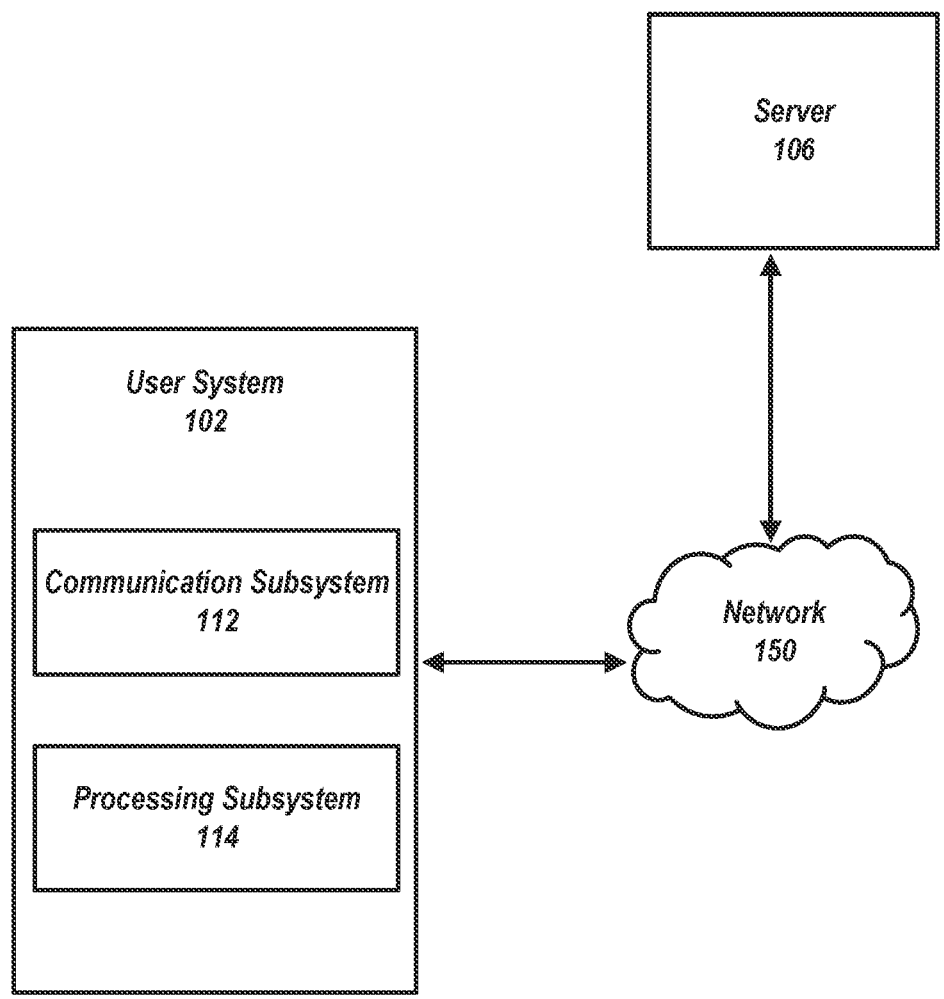
FIG. 1 illustrates an example computing environment for utilizing service workers to obfuscate application data associated with web applications, in accordance with some embodiments of this disclosure.

FIG. 1 shows an example computing system 100 for utilizing service workers to obfuscate application data associated with web applications. Environment 100 includes user system 102, and server system 106. User system 102 may execute instructions for utilizing service workers to obfuscate application data. User system 102 may include software, hardware or a combination of the two. For example, user system 102 may be a physical computing device or a virtual computing device that is running on a physical computer system. User system 102 may be a personal computer, a smart phone, a laptop computing device, an electronic tablet, or another suitable user device. User system 102 may include communication subsystem 112 and processing subsystem 114.

User system 102 may include communication subsystem 112 and processing subsystem 114. User system 102 may include other components (e.g., as described in FIG. 4). Communication subsystem 112 may include software components, hardware components, or a combination of both. For example, communication subsystem 112 may include a network card (e.g., a wireless network card and/or a wired network card) that is coupled with software to drive the card. Processing subsystem 114 may include software components, hardware components, or a combination of both. For example, processing subsystem 114 may include software components that access data in memory and/or storage, and may use one or more processors to perform its operations Server 106 may host various applications that have server components. In some embodiments server 106 may host server-side components for multiple applications while those applications may have a client-side component that is executed on a client device (e.g., user system 102). Server 106 may include software, hardware, or a combination of the two. For example, server 106 may be a physical server, or a virtual server that is running on a physical computer system. Network 150 may be a local area network, a wide area network (e.g., the Internet), or a combination of the two.

Figure 2:
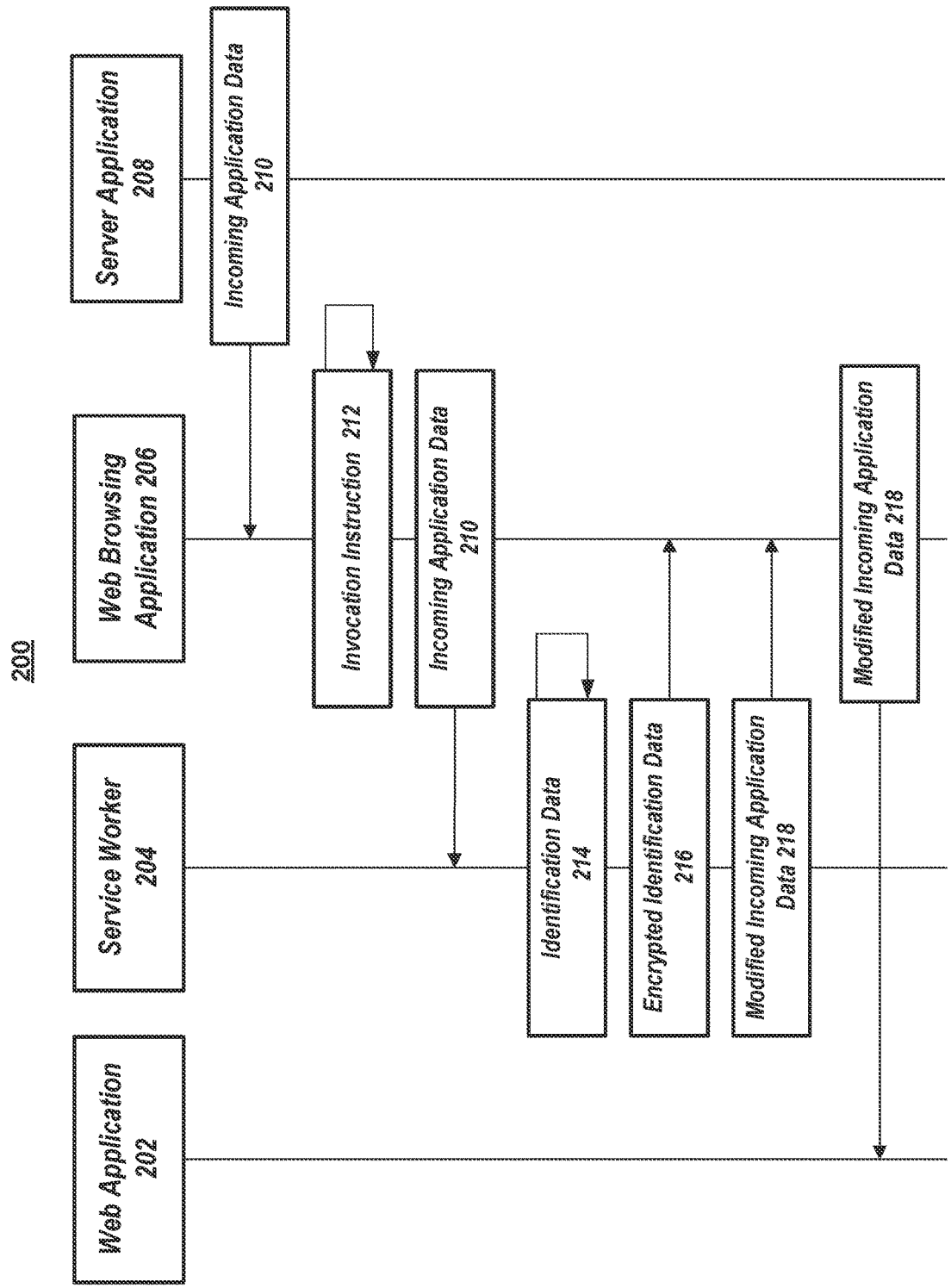
FIG. 2 exemplifies movement of data as the data obfuscation process is performed, in accordance with some embodiments of this disclosure.

FIG. 2 exemplifies movement of data as the data obfuscation process is performed by components of system 200. System 200 may include server application 208. Server application 208 may be any application that serves data to a client application. In some embodiments, server application 208 may be hosted on server 106 described with respect to FIG. 1. System 200 may also include web browsing application 206. Web browsing application 206 may be any web browser capable of browsing Internet websites and executing applications embedded into those websites. Multiple web browsing applications are available today including Google Chrome™ Microsoft Edge®, Mozilla Firefox®, and others. Web browsing application 206 (e.g., the first application) may receive incoming application data 210 (e.g., first application data) from server application 208. Incoming application data 210 (e.g., first application data) may be received for use by web application 202 (e.g., second application) that is executed within the first application.

Web application 202 may be any application that is executed within a web browsing application. For example, web application 202 (the second application) may be an email application, an instant messaging application, a photo editing application, a calendaring application, or another suitable application. Incoming application data 210 (first application data) may be destined for web application 202 (the second application). Thus, web browsing application 206 may access incoming application data 210 to determine the destination of incoming application data 210. For example, incoming application data 210 may include an application identifier and/or a session identifier for the corresponding web application.

However, when web browsing application 206 (the first application) receives incoming application data, web browsing application 206 may determine whether there is a corresponding service worker 204 (third application) installed for web application 202. Thus, web browsing application 206 may retrieve a first identifier associated with the web application. The first identifier may be an application name, a number, a string, hexadecimal number, a web application path, or another suitable identifier. Web browsing application 206 may determine, using the first identifier associated with the web application, that service worker 204 (e.g., third application) corresponding to the web application is installed within the web browsing application 206. For example, web browsing application 206 may access a data structure storing web application identifiers and corresponding service worker identifiers. If the table includes an application identifier associated with a particular web application, web browsing application 206 may determine that there is an associated service worker (e.g., service worker 204). A service worker may be a piece of software code that includes instructions on processing particular application events for the associated web application. Thus, if there is a service worker associated with a web application, web browsing application 206 may retrieve a second identifier associated with the service worker.

In some embodiments, web browsing application 206 (the first application) may determine that a service worker corresponding to the web application (e.g., service worker 204) is not installed, but is available. The determination may occur, for example, when the web application is launched. In some embodiments, web browsing application 206 may make the determination when incoming application data 210 is received from server application 208. Web application 202 may include metadata that indicates that a service worker installation package is available for the application and a location (e.g., a uniform resource locator (URL)) where the service worker installation package may be retrieved. Thus, the web browsing application may use the location information (e.g., the URL) to retrieve the installation package and install the service worker (e.g., service worker 204).

Web browsing application 206 (the first application) may invoke service worker 204 (the third application) using invocation instruction 212. Invocation instruction 212 may be a command to invoke service worker 204, for example, using the second identifier. For example, invocation instruction 212 may be an API call to instantiate the service worker. In some embodiments, the API call to invoke service worker 204 may include incoming application data 210, which is passed to service worker 204 for processing. In some embodiments, incoming application data 210 may be passed to service worker 204 after that service worker is invoked. When service worker 204 is invoked (the third application), it is enabled to communicate with web browsing application 206 (the first application) and web application 202 (the second application).

In some embodiments, web browsing application 206 (first application) may invoke service worker 204 (third application) using the following mechanism. Web browsing application 206 may retrieve an identifier associated with the web application. The identifier may be a number, a string, an application name, a hexadecimal number or another suitable identifier. Web browsing application 206 may compare the identifier associated with web application 202 with a plurality of identifiers. Each identifier in the plurality of identifiers may correspond to an application that is able to interface between web browsing application 206 and a different application being executed within web browsing application 206. For example, each service worker may be associated with an identifier of the web application corresponding to the service worker. Thus, web browsing application 206 is able to identify the correct service worker to instantiate. Web browsing application 206 may then retrieve service worker 204 based on determining the identifier associated with web application 202 matches an identifier associated with service worker 204.

When service worker 204 in instantiated and receives incoming application data 210, server worker 204 (the third application) may extract, from incoming application data 210 (first application data), identification data 214 associated with a user. Service worker 204 may include software code that indicates which fields within the incoming application data should be extracted. For example, incoming application data 210 may be a data structure with particular fields that have field identifiers (e.g., field names). That data may correspond to identification data 214. Service worker 204 may include instructions indicating field identifiers that should have data extracted from those fields. When service worker 204 locates one or more fields, service worker 204 may extract the data from those fields. In some embodiments, incoming application data 210 (first application data) may include metadata indicating location of identification data 214 within incoming application data 210. In some embodiments, service worker 204 may replace the data with template data or erase the data from those fields. Template data may be placeholder value(s) that may be interpreted by web application 202 and processed properly. In some embodiments, identification data may be replaced with an identifier that may be used to locate the identification data during a retrieval operation, to be discussed later in this disclosure. Thus, incoming application data 210 (the first application data) is transformed into modified first application data 218 that does not include the identification data 214. It should be noted that identification data is not used by the web application for its processing.

Service worker 204 may encrypt the identification data into encrypted identification data. Service worker 204 may use any encryption algorithm to perform the encryption. For example, service worker 204 may use a single key to perform encryption (e.g., use symmetric encryption). The same key may be used to decrypt the encrypted identification data. Service worker 204 may use asymmetric encryption (e.g., public/private key pairs) to encrypt the identification data. When identification data 214 has been encrypted into encrypted identification data 216, service worker 204 may store that data as any other data that web browsing application 206 stores. For example, service worker may pass the data to web browsing application 206 to be stored within a storage location that is shared amongst all web applications. Thus, service worker 204 may provide both encrypted identification data 216 and modified incoming application data 218 to web browsing application 206. Web browsing application 205 may provide modified incoming application data 218 to web application 202 for processing. In some embodiments, service worker 204 may provide modified incoming application data 218 direction to web application 202, bypassing web browsing application 206.

In some embodiments, web application 202 may attempt communications back to server application 208. In this instance, identification data may be added back into the communication so that server application 208 may determine which user/application session is sending the data.

Figure 3:
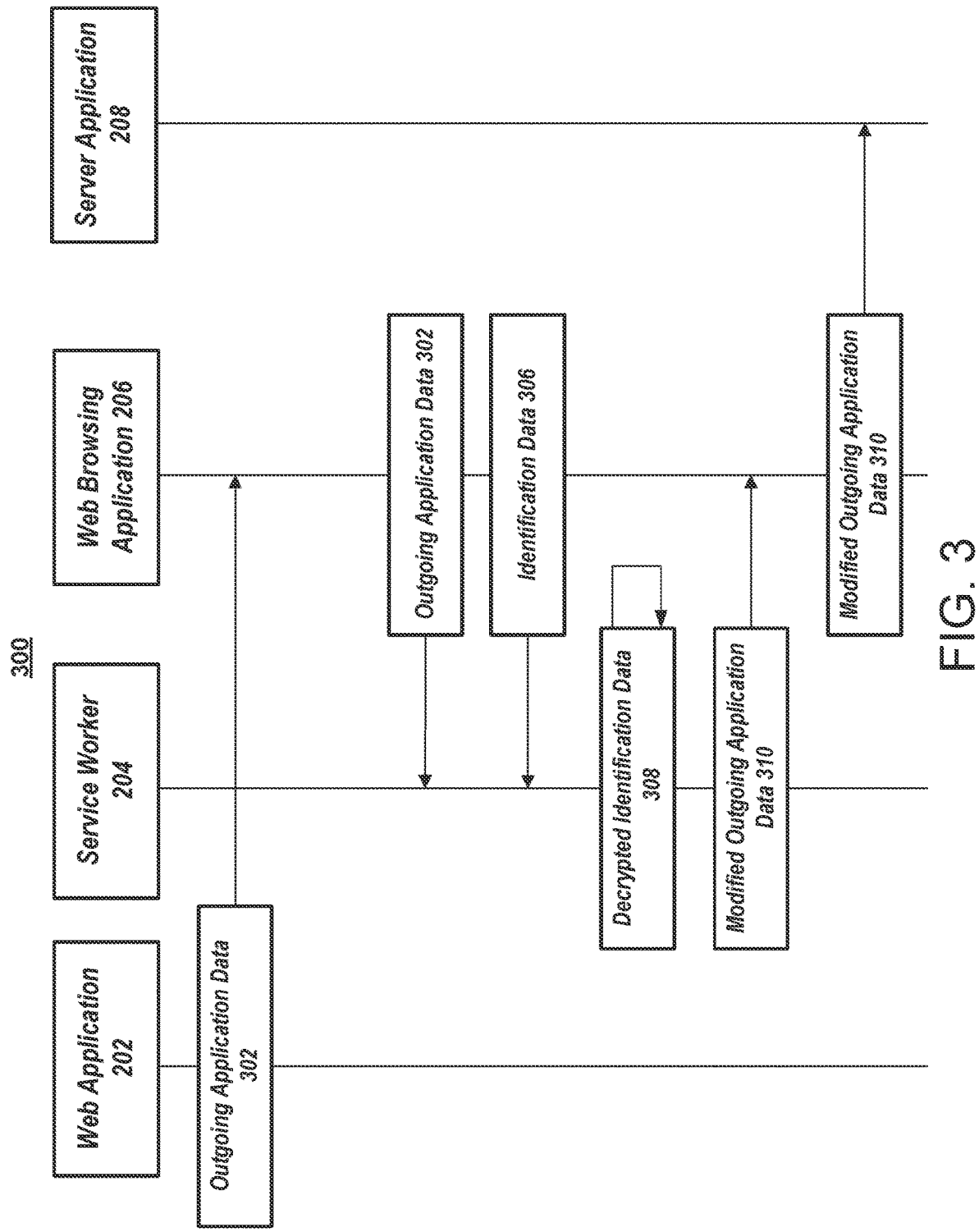
FIG. 3 exemplifies movement of data as the data obfuscation process is reversed for outgoing data, in accordance with some embodiments.

FIG. 3 illustrates movement of data 300 as the data obfuscation process is reversed. Web application 202 may generate outgoing application data 302 and pass that data to web browsing application 206. Thus, the first application (web browsing application 206) may receive second application data (outgoing application data 302) from the second application (web application 202). In some embodiments, web application 202 may pass outgoing application data 302 to service worker 204 directly. In some embodiments, web browsing application 206 may invoke service worker 204 prior to passing outgoing application data 302 to service worker 204. The invocation operation may be performed using an API call as described above. The API call may include the outgoing application data.

When service worker 204 (the third application) is invoked and receives outgoing application data 302, service worker 204 may locate identification data corresponding to outgoing application data 302. For example, service worker 204 may have stored a path on a storage device where the identification data may be retrieved. In some embodiments, service worker 204 may access shared storage associated with web browsing application 206 to locate identification data 306. It should be noted that identification data 306 may be stored in an encrypted state. In some embodiments, web application 202 may generate a data structure for outgoing application data 302. That data structure may include one or more fields for adding the identification data. Those fields may store data received as part of incoming application data in corresponding fields. Thus, if the data in those fields includes an identifier (e.g., a path, a string, a hexadecimal number, or another suitable identifier) that may be used to locate identification data 306, service worker 204 may use that data for location identification data 306. Service worker 204 may decrypt the identification data into decrypted identification data 308 and add that decrypted data into outgoing application data to generate modified outgoing application data 310. Service worker 204 may add the data to corresponding fields within the data structure corresponding to outgoing application data 302. Service worker 204 may then pass modified outgoing application data 310 to web browsing application 206. Web browsing application 205 may transmit modified outgoing application data 310 to server application 208 (e.g., hosted at a remote computing device).

Figure 4:
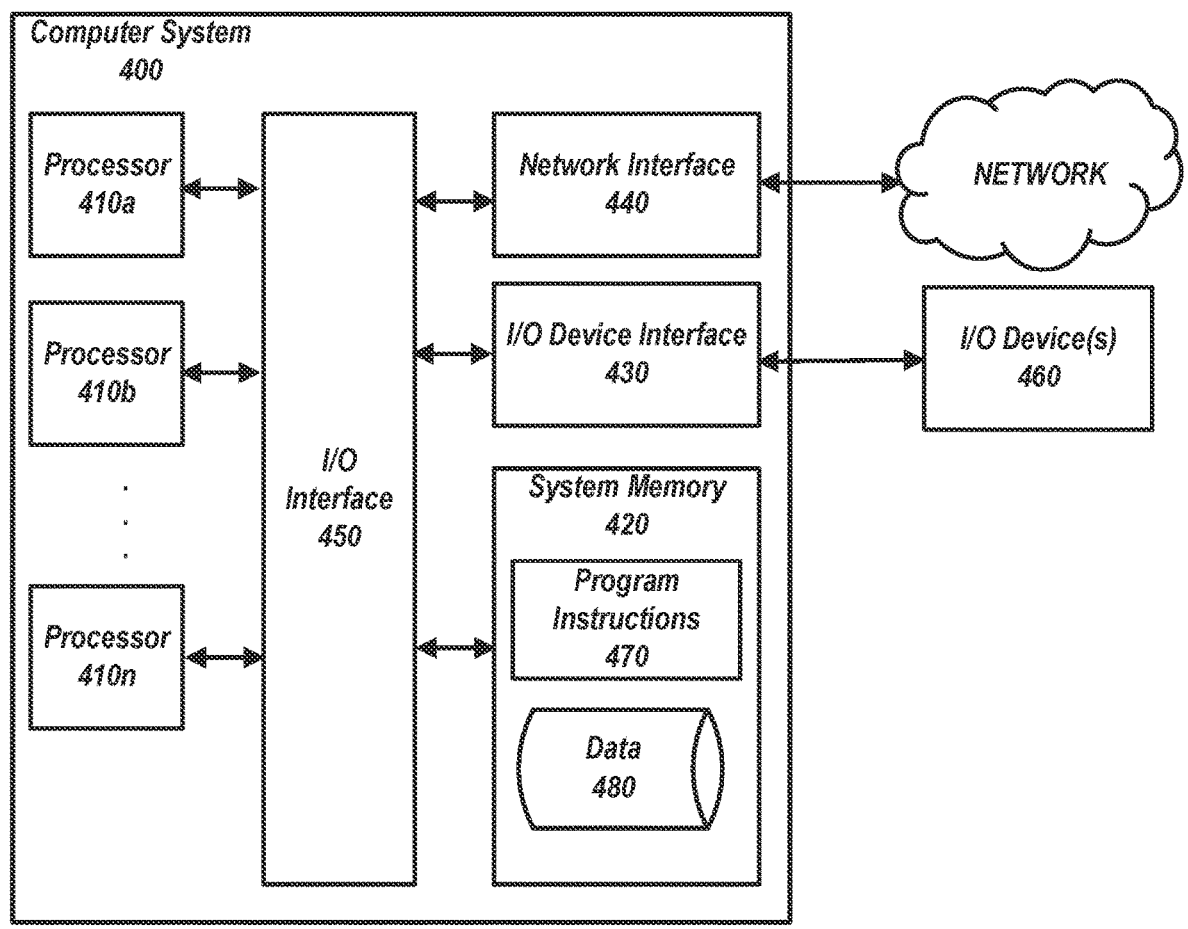
FIG. 4 shows an example computing system that may be used in accordance with some embodiments of this disclosure.

FIG. 4 is a diagram that illustrates an exemplary computing system 400 in accordance with embodiments of the present technique. Various portions of systems and methods described herein, may include or be executed on one or more computer systems similar to computing system 400. Further, processes and modules described herein may be executed by one or more processing systems similar to that of computing system 400.

Computing system 400 may include one or more processors (e.g., processors 410a-410n) coupled to system memory 420, an input/output I/O device interface 430, and a network interface 440 via an input/output (I/O) interface 450. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 400. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 420). Computing system 400 may be a units-processor system including one processor (e.g., processor 410a), or a multi-processor system including any number of suitable processors (e.g., 410a-410n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 400 may include a plurality of computing devices (e.g., distributed computer systems) to implement various processing functions.

I/O device interface 430 may provide an interface for connection of one or more I/O devices 460 to computing system 400. I/O devices may include devices that receive input (e.g., from a user) or output information (e.g., to a user). I/O devices 460 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 460 may be connected to computing system 400 through a wired or wireless connection. I/O devices 460 may be connected to computing system 400 from a remote location. I/O devices 460 located on a remote computer system, for example, may be connected to computing system 400 via a network and network interface 440.

Network interface 440 may include a network adapter that provides for connection of computing system 400 to a network. Network interface 440 may facilitate data exchange between computing system 400 and other devices connected to the network. Network interface 440 may support wired or wireless communication. The network may include an electronic communication network, such as the Internet, a local area network (LAN), a wide area network (WAN), a cellular communications network, or the like.

System memory 420 may be configured to store program instructions 470 or data 480. Program instructions 470 may be executable by a processor (e.g., one or more of processors 410a-410n) to implement one or more embodiments of the present techniques. Instructions 470 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 420 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 420 may include a non-transitory computer readable storage medium that may have program instructions stored thereon that are executable by a computer processor (e.g., one or more of processors 410a-410n) to cause the subject matter and the functional operations described herein. A memory (e.g., system memory 420) may include a single memory device and/or a plurality of memory devices (e.g., distributed memory devices).

I/O interface 450 may be configured to coordinate I/O traffic between processors 410a-410n, system memory 420, network interface 440, I/O devices 460, and/or other peripheral devices. I/O interface 450 may perform protocol, timing, or other data transformations to convert data signals from one component (e.g., system memory 420) into a format suitable for use by another component (e.g., processors 410a-410n). I/O interface 450 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 400 or multiple computer systems 400 configured to host different portions or instances of embodiments. Multiple computer systems 400 may provide for parallel or sequential processing/execution of one or more portions of the techniques described herein.

Those skilled in the art will appreciate that computing system 400 is merely illustrative and is not intended to limit the scope of the techniques described herein. Computing system 400 may include any combination of devices or software that may perform or otherwise provide for the performance of the techniques described herein. For example, computing system 400 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 400 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 400 may be transmitted to computing system 400 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present disclosure may be practiced with other computer system configurations.

Figure 5:
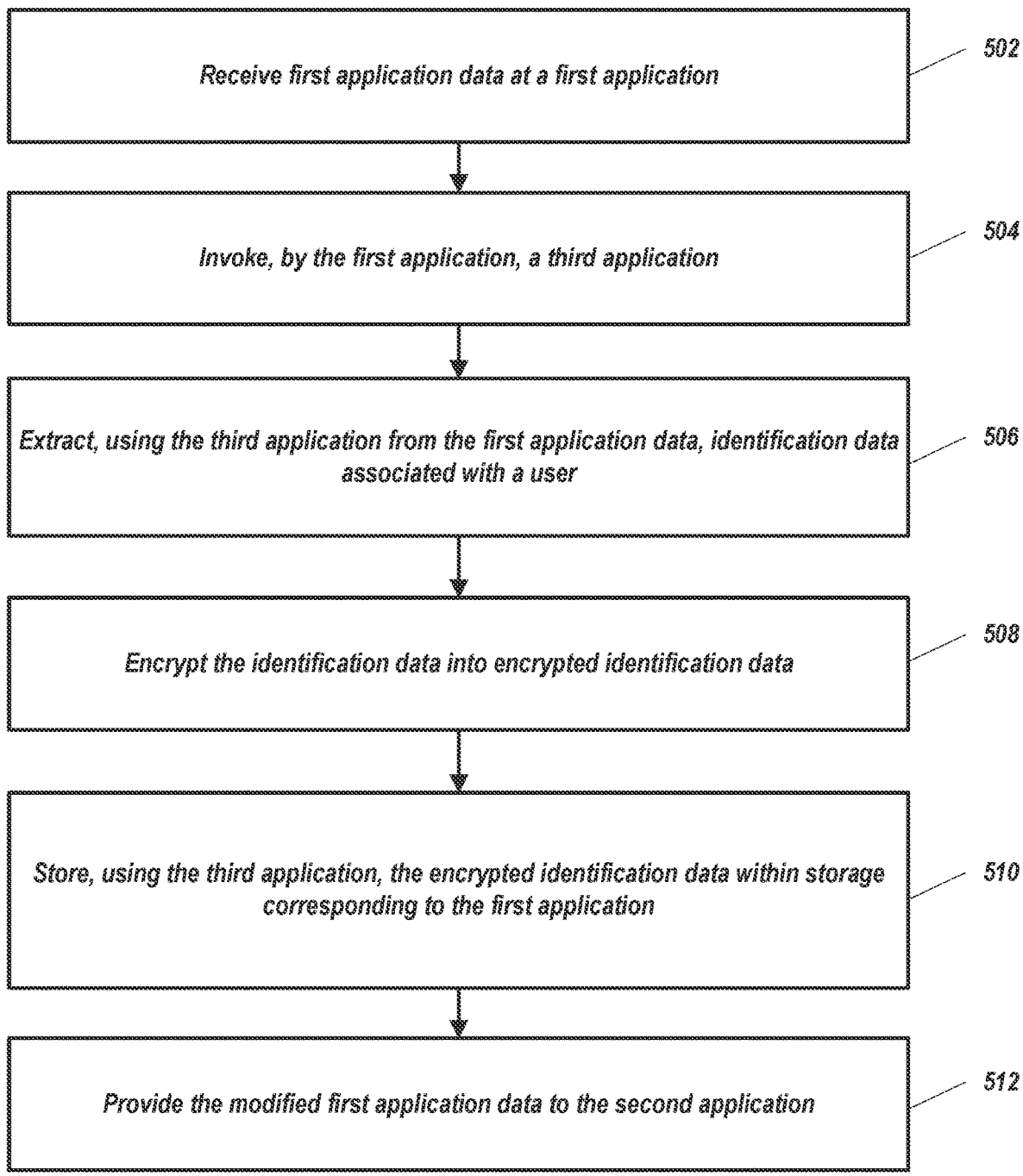
FIG. 5 shows an example flowchart of the actions involved in disclosed data obfuscation process, in accordance with some embodiments of this disclosure.

FIG. 5 shows an example flowchart of the actions involved in the disclosed data obfuscation process. At 502, user system 102 receives first application data at a first application. For example, user system 102 may be hosted on a computer system 400. Thus, first application data may be received through network interface 440 and then passed via I/O Interface 450 to system memory 420. At 504, user system 102 (e.g., using one or more components in system 100 (FIG. 1) and/or computing system 400 via one or more processors 410a-410n and system memory 420 (FIG. 4)) invokes, using the first application, a third application. At 506, user system 102 (e.g., using one or more components in system 100 (FIG. 1) and/or computing system 400 via one or more processors 410a-410n, I/O interface 450, and/or system memory 420 (FIG. 4)) extracts, using the third application from the first application data, identification data associated with a user.

At 508, user system 102 (e.g., using one or more components in system 100 (FIG. 1) and/or computing system 400 via one or more processors 410a-410n (FIG. 4)) encrypts the identification data into encrypted identification data. At 510, user system 102 (e.g., using one or more components in system 100 (FIG. 1) and/or computing system 400 (FIG. 4)) stores, using the third application, the encrypted identification data within storage corresponding to the first application. At 512, user system 102 (e.g., using one or more components in system 100 (FIG. 1) and/or computing system 400 via the network interface 440 (FIG. 4)) provides the modified first application data to the second application.

Figure 6:
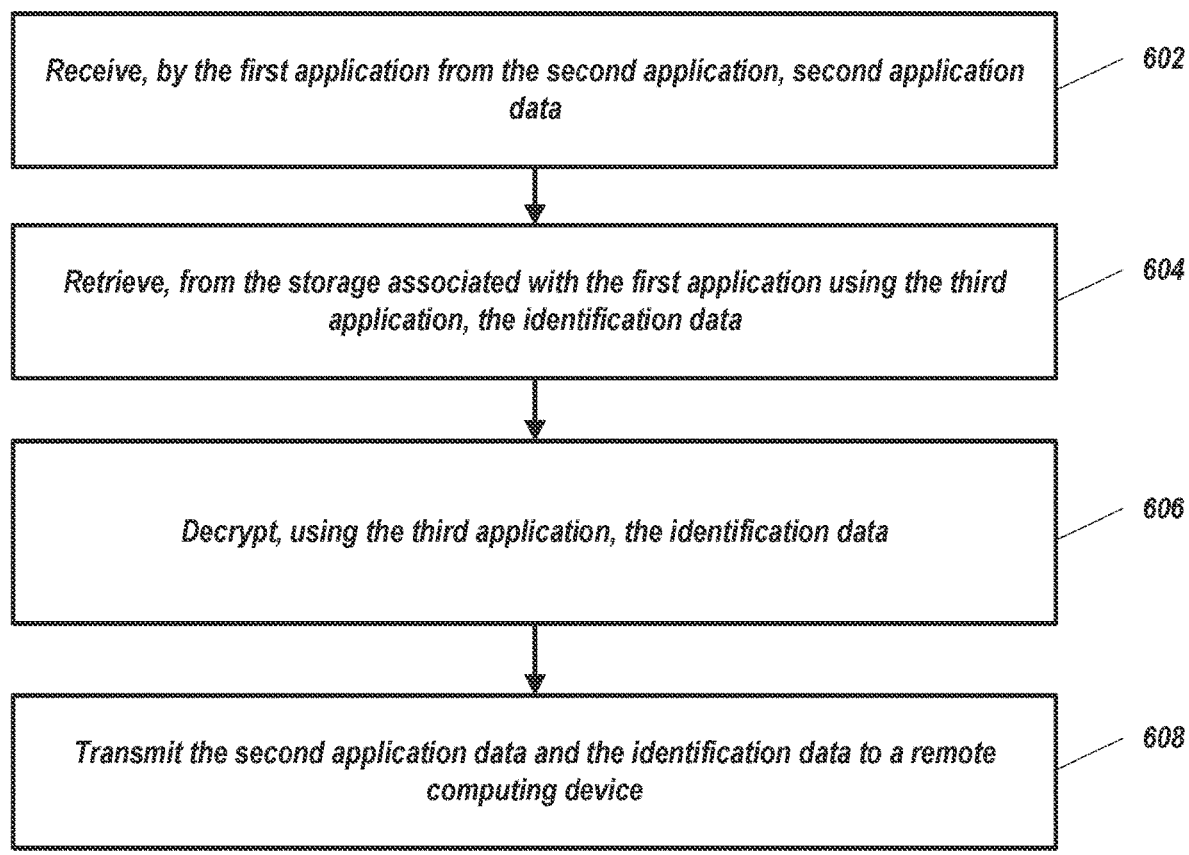
FIG. 6 shows an example flowchart of the actions involved in reversing the disclosed data obfuscation process, in accordance with some embodiments of this disclosure.

FIG. 6 shows an example flowchart of the actions involved in reversing the disclosed data obfuscation process. At 602, user system 102 (e.g., using one or more components in system 100 (FIG. 1) and/or computing system 400 via one or more processors 410a-410n (FIG. 4)) receives, at the first application from the second application, second application data. At 604, user system 102 (e.g., using one or more components in system 100 (FIG. 1) and/or computing system 400 via one or more processors 410a-410n (FIG. 4)), retrieves, from the storage associated with the first application using the third application, the identification data. At 606, user system 102 (e.g., using one or more components in system 100 (FIG. 1) and/or computing system 400 via one or more processors 410*a*-410*n* (FIG. 4)), decrypts, using the third application, the identification data. At 608, user system 102 (e.g., using one or more components in system 100 (FIG. 1) and/or computing system 400 via one or more processors 410*a*-410*n* (FIG. 4)), transmits the second application data and the identification data to a remote computing device.

It is contemplated that the actions or descriptions of FIG. 5 and FIG. 6 may be used with any other embodiment of this disclosure. In addition, the actions and descriptions described in relation to FIG. 5 and FIG. 6 may be done in alternative orders or in parallel to further the purposes of this disclosure. For example, each of these actions may be performed in any order, in parallel, or simultaneously to reduce lag or increase the speed of the system or method. Furthermore, it should be noted that any of the devices or components discussed in relation to FIGS. 1-4 could be used to perform one or more of the actions in FIG. 5 and/or in FIG. 6.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example, such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine-readable medium. In some cases, third-party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several disclosures. Rather than separating those disclosures into multiple isolated patent applications, applicants have grouped these disclosures into a single document because their related subject matter lends itself to economies in the application process. But the distinct advantages and aspects of such disclosures should not be conflated. In some cases, embodiments address all of the deficiencies noted herein, but it should be understood that the disclosures are independently useful, and some embodiments address only a subset of such problems or offer other, unmentioned benefits that will be apparent to those of skill in the art reviewing the present disclosure. Due to costs constraints, some features disclosed herein may not be presently claimed and may be claimed in later filings, such as continuation applications or by amending the present claims. Similarly, due to space constraints, neither the Abstract nor the Summary sections of the present document should be taken as containing a comprehensive listing of all such disclosures or all aspects of such disclosures.

It should be understood that the description and the drawings are not intended to limit the disclosure to the particular form disclosed, but to the contrary, the intention is to cover all modifications, equivalents, and alternatives falling within the spirit and scope of the present disclosure as defined by the appended claims. Further modifications and alternative embodiments of various aspects of the disclosure will be apparent to those skilled in the art in view of this description. Accordingly, this description and the drawings are to be construed as illustrative only and are for the purpose of teaching those skilled in the art the general manner of carrying out the disclosure. It is to be understood that the forms of the disclosure shown and described herein are to be taken as examples of embodiments. Elements and materials may be substituted for those illustrated and described herein, parts and processes may be reversed or omitted, and certain features of the disclosure may be utilized independently, all as would be apparent to one skilled in the art after having the benefit of this description of the disclosure. Changes may be made in the elements described herein without departing from the spirit and scope of the disclosure as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing actions A, B, C, and D) encompasses both all such attributes or functions being mapped to all such objects and subsets of the attributes or functions being mapped to subsets of the attributes or functions (e.g., both all processors each performing actions A-D, and a case in which processor 1 performs action A, processor 2 performs action B and part of action C, and processor 3 performs part of action C and action D), unless otherwise indicated. Further, unless otherwise indicated, statements that one value or action is "based on" another condition or value encompass both instances in which the condition or value is the sole factor and instances in which the condition or value is one factor among a plurality of factors. The term "each" is not limited to "each and every" unless indicated otherwise. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for utilizing service workers to obfuscate application data associated with web applications, the method comprising: receiving, with a first application, first application data, wherein the first application data is received for use by a second application that is executed within the first application; invoking, by the first application, a third application, wherein the third application is enabled to communicate with the first application and the second application; extracting, using the third application from the first application data, identification data associated with a user, wherein the first application data is transformed into modified first application data that does not include the identification data; encrypting the identification data into encrypted identification data; storing, using the third application, the encrypted identification data within storage corresponding to the first application, wherein the storage corresponding to the first application is shared amongst the second application and other applications executing within the first application; and providing the modified first application data to the second application.

2. The method of any of prior embodiments, further comprising: receiving, by the first application from the second application, second application data; retrieving, from the storage associated with the first application using the third application, the identification data; decrypting, using the third application, the identification data; and transmitting the second application data and the identification data to a remote computing device.

3. The method of any of prior embodiments, wherein receiving the first application data comprises: receiving the first application data from a remote computing device, wherein the first application is a web browsing application, and the second application is a web application that is executed within the web browsing application, and wherein the first application data is associated with the web application.

4. The method of any of prior embodiments, wherein invoking the third application comprises executing a first application programming interface (API) call that includes the first application data.

5. The method of any of prior embodiments, further comprising: retrieving an identifier associated with the second application; comparing the identifier associated with the second application with a plurality of identifiers, wherein each identifier in the plurality of identifiers corresponds to an application that is able to interface between the first application and a different application being executed within the first application; and retrieving the third application based on determining the identifier associated with the second application matches the third application.

6. The method of any of prior embodiments, further comprising: determining, using the second application, that the third application is not installed; retrieving, using uniform resource locator (URL) associated with the third application, an installation package corresponding to the third application; and installing the third application using the installation package.

7. The method of any of prior embodiments, wherein the first application data comprises metadata indicating the identification data within the first application data.

8. The method of any of prior embodiments, wherein the identification data is not used by the second application.

9. A tangible, non-transitory, machine-readable medium storing instructions that, when executed by a data processing apparatus, cause the data processing apparatus to perform operations comprising those of any of embodiments 1-8.

10. A system comprising: one or more processors; and memory storing instructions that, when executed by the processors, cause the processors to effectuate operations comprising those of any of embodiments 1-8.

11. A system comprising means for performing any of embodiments 1-8.

What is claimed is:

1. A system for utilizing service workers to obfuscate application data associated with web applications, the system comprising:
   memory; and
   one or more processors to cause the system to:
      receive, at a web browsing application and from a remote computing device, incoming application data associated with a web application that is executed within the web browsing application;
      invoke, by the web browsing application and using a first application programming interface (API) call, a service worker corresponding to the web application, wherein the first API call includes the incoming application data;
      extract, using the service worker and from the incoming application data, identification data associated with a user, wherein the incoming application data is transformed into modified incoming application data that does not include the identification data;
      encrypt, by the service worker, the identification data into encrypted identification data;
      store, by the service worker and after encrypting the identification data into the encrypted identification data, the encrypted identification data within web browsing application storage by passing the encrypted identification data to the web browsing application;
      provide, from the service worker and to the web browsing application, the modified incoming application data;
      provide, from the web browsing application and to the web application, the modified incoming application data;
      receive, by the web browsing application and from the web application, outgoing application data associated with the web application;
      invoke, using a second API call, the service worker associated with the web application, wherein the second API call includes the outgoing application data;
      retrieve, from the web browsing application storage and using the service worker, the encrypted identification data;
      decrypt, by the service worker and after retrieving the encrypted identification data from the web browsing application storage, the encrypted identification data into the identification data;

generate modified outgoing application data by including the identification data in the outgoing application data; and transmit the modified outgoing application data to the remote computing device.

2. The system of claim 1, wherein the one or more processors further cause the system to:

retrieve a first identifier associated with the web application;

determine, using the first identifier associated with the web application, that the service worker corresponding to the web application is installed within the web browsing application; and retrieve a second identifier associated with the service worker.

3. The system of claim 2, wherein the first API call includes the second identifier associated with the service worker.

4. The system of claim 1, wherein the one or more processors further cause the system to:

invoke, from the web browsing application, the web application;

determine, using the web application, that the service worker corresponding to the web application is not installed;

retrieve, using a uniform resource locator (URL) associated with the service worker, an installation package corresponding to the service worker; and install the service worker using the installation package.

5. A method for utilizing service workers to obfuscate application data associated with web applications, the method comprising:

receiving, with a first application, first application data, wherein the first application data is received for use by a second application that is executed within the first application;

invoking, by the first application, a third application, wherein the third application is enabled to communicate with the first application and the second application;

extracting, using the third application from the first application data, identification data associated with a user, wherein the first application data is transformed into modified first application data that does not include the identification data;

encrypting, by the third application, the identification data into encrypted identification data;

storing, by the third application, the encrypted identification data by passing the encrypted identification data to the first application to be stored in storage shared amongst the second application and other applications executing within the first application, wherein the first application is a web browsing application; and providing the modified first application data to the second application.

6. The method of claim 5, further comprising:

receiving, by the first application and from the second application, second application data;

retrieving, from the storage and using the third application, the identification data;

decrypting, using the third application, the identification data; and transmitting the second application data and the identification data to a remote computing device.

7. The method of claim 5, wherein receiving the first application data comprises:

receiving the first application data from a remote computing device, wherein the second application is a web application that is executed within the web browsing application, and wherein the first application data is associated with the web application.

8. The method of claim 5, wherein invoking the third application comprises executing a first application programming interface (API) call that includes the first application data.

9. The method of claim 5, further comprising:

retrieving an identifier associated with the second application;

comparing the identifier associated with the second application with a plurality of identifiers, wherein each identifier in the plurality of identifiers corresponds to an application that is able to interface between the first application and a different application being executed within the first application; and retrieving the third application based on determining the identifier associated with the second application matches the third application.

10. The method of claim 5, further comprising:

determining, using the second application, that the third application is not installed;

retrieving, using a uniform resource locator (URL) associated with the third application, an installation package corresponding to the third application; and installing the third application using the installation package.

11. The method of claim 5, wherein the first application data comprises metadata indicating the identification data within the first application data.

12. The method of claim 5, wherein the identification data is not used by the second application.

13. One or more non-transitory, computer-readable media for utilizing service workers to obfuscate application data associated with web applications, comprising instructions that, when executed by one or more processors, cause operations comprising:

receiving, with a first application, first application data, wherein the first application data is received for use by a second application that is executed within the first application;

invoking, by the first application a third application, wherein the third application is enabled to communicate with the first application and the second application;

extracting, using the third application from the first application data, identification data associated with a user, wherein the first application data is transformed into modified first application data that does not include the identification data;

encrypting, by the third application, the identification data into encrypted identification data;

storing, by the third application, the encrypted identification data by passing the encrypted identification data to the first application to be stored in storage shared amongst the second application and other applications executing within the first application, wherein the first application is a web browsing application; and providing the modified first application data to the second application.

14. The one or more non-transitory, computer-readable media of claim 13, wherein the instructions further cause the one or more processors to perform operations comprising:

receiving, by the first application and from the second application, second application data;

retrieving, from the storage and using the third application, the identification data;

decrypting, using the third application, the identification data; and transmitting the second application data and the identification data to a remote computing device.

15. The one or more non-transitory, computer-readable media of claim 13, wherein the instructions for receiving the first application data further cause the one or more processors to receive the first application data from a remote computing device, wherein the second application is a web application that is executed within the web browsing application, and wherein the first application data is associated with the web application.

16. The one or more non-transitory, computer-readable media of claim 14, wherein the instructions for invoking the third application further cause the one or more processors to perform operations comprising executing a first application programming interface (API) call that includes the first application data.

17. The one or more non-transitory, computer-readable media of claim 13, wherein the instructions further cause the one or more processors to perform operations comprising:

retrieving an identifier associated with the second application;

comparing the identifier associated with the second application with a plurality of identifiers, wherein each identifier in the plurality of identifiers corresponds to an application that is able to interface between the first application and a different application being executed within the first application; and retrieving the third application based on determining the identifier associated with the second application matches the third application.

18. The one or more non-transitory, computer-readable media of claim 13, wherein the instructions further cause the one or more processors to perform operations comprising:

determining, using the second application, that the third application is not installed;

retrieving, using a uniform resource locator (URL) associated with the third application, an installation package corresponding to the third application; and installing the third application using the installation package.

19. The one or more non-transitory, computer-readable media of claim 13, wherein the first application data comprises metadata indicating the identification data within the first application data.

20. The one or more non-transitory, computer-readable media of claim 13, wherein the identification data is not used by the second application.

* * * * *